United States Patent
Hotta et al.

(10) Patent No.: US 11,271,505 B2
(45) Date of Patent: Mar. 8, 2022

(54) PERMANENT-MAGNET SYNCHRONOUS MOTOR AND VENTILATION BLOWER

(71) Applicant: Mitsubishi Electric Corporation, Tokyo (JP)

(72) Inventors: Kazuhiko Hotta, Tokyo (JP); Ryota Kurosawa, Tokyo (JP); Takuya Saeki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/054,203

(22) PCT Filed: May 30, 2018

(86) PCT No.: PCT/JP2018/020809
§ 371 (c)(1),
(2) Date: Nov. 10, 2020

(87) PCT Pub. No.: WO2019/229885
PCT Pub. Date: Dec. 5, 2019

(65) Prior Publication Data
US 2021/0218355 A1    Jul. 15, 2021

(51) Int. Cl.
*H02P 21/00*    (2016.01)
*H02P 21/22*    (2016.01)
(Continued)

(52) U.S. Cl.
CPC .............. *H02P 21/22* (2016.02); *H02P 21/18* (2016.02); *H02P 27/08* (2013.01); *H02P 2207/05* (2013.01)

(58) Field of Classification Search
CPC ............. H02P 21/22; H02P 21/18; H02P 7/08
(Continued)

(56) References Cited

U.S. PATENT DOCUMENTS 5,463,299 A * 10/1995 Futami ..................... H02P 6/06
318/400.13
2008/0224645 A1 * 9/2008 Ide .......................... H02P 21/18
318/608
(Continued)

FOREIGN PATENT DOCUMENTS

JP    2006230200 A    8/2006
JP    2010268629 A    11/2010
(Continued)

OTHER PUBLICATIONS

International Search Report (with English Translation) and Written Opinion issued in corresponding International Patent Application No. PCT/JP2018/020809, 8 pages (dated Aug. 14, 2018).
(Continued)

*Primary Examiner* — Erick D Glass
(74) *Attorney, Agent, or Firm* — Buchanan Ingersoll & Rooney PC (57) ABSTRACT

A permanent-magnet synchronous motor includes an inverter power circuit that converts direct-current power to three-phase alternating-current power, a motor bodydriven by the three-phase alternating-current power, a current detector that calculates an excitation current value and a torque current value from motor stator current values and an estimated value of a magnetic pole position of the rotor, a magnetic pole position detector that determines, for output to the current detector, the estimated value from the excitation current value, the torque current value, and supply voltage information, a voltage calculation unit that calculates, by means of the excitation current value, the torque
(Continued)

current value, and an angular velocity calculated from the estimated value, the supply voltage information that causes the torque current value to approximate a torque current command value, and an inverter controller that controls the inverter power circuit on a basis of the supply voltage information and the estimated value.

8 Claims, 5 Drawing Sheets

(51) Int. Cl.
 *H02P 21/18* (2016.01)
 *H02P 27/08* (2006.01)
(58) Field of Classification Search
 USPC .................................................. 318/400.02
 See application file for complete search history.

(56) References Cited

U.S. PATENT DOCUMENTS

| | | |
|---|---|---|
| 2010/0242549 A1 | 9/2010 | Hosoito et al. |
| 2011/0175560 A1* | 7/2011 | Akiyama ............... H02P 6/18 318/400.32 |
| 2014/0042938 A1 | 2/2014 | Shoji et al. |
| 2014/0100701 A1* | 4/2014 | Hakumura ............ H02P 6/10 700/280 |
| 2015/0372628 A1* | 12/2015 | Oono ..................... H02P 21/05 318/801 |
| 2015/0372630 A1 | 12/2015 | Ishikawa |
| 2017/0070172 A1 | 3/2017 | Je et al. |

FOREIGN PATENT DOCUMENTS

| | | |
|---|---|---|
| JP | 6225326 B2 | 11/2017 |
| TW | 201351870 A | 12/2013 |
| TW | 201620241 A | 6/2016 |
| WO | 2012144456 A1 | 10/2012 |

OTHER PUBLICATIONS

Office Action (Patent Examination Report No. 2) dated Aug. 13, 2021, in corresponding Australian Patent Application No. 2018425573. (3 pages).

Office Action (Examination Report No. 1) dated May 14, 2021, by the Australian Patent Office in corresponding Australian Patent Application No. 2018425573. (3 pages).

Extended European Search Report dated May 11, 2021, issued by the European Patent Office in corresponding European Application No. 18920635.2. (8 pages).

Office Action (Notice of Reasons for Refusal) dated May 17, 2021, by the Japanese Patent Office in corresponding Japanese Patent Application No. 2020-522462 and English translation of the Office Action. (6 pages).

* cited by examiner

PERMANENT-MAGNET SYNCHRONOUS MOTOR AND VENTILATION BLOWER

FIELD

The present invention relates to a permanent-magnet synchronous motor and a ventilation blower including the same.

BACKGROUND

A ventilating fan or a blower often uses an induction motor connected directly to an alternating-current power supply. In recent years, a permanent-magnet synchronous motor with a rotor including permanent magnets has been used for a wide range of variable speed control, power consumption saving, or low-noise driving, and driving the permanent-magnet synchronous motor by means of a pulse width modulation (PWM) inverter has been adopted as a drive method. The permanent-magnet synchronous motor adopting this drive method is referred to as "PWM inverter-driven permanent-magnet synchronous motor".

Inside the PWM inverter-driven permanent-magnet synchronous motor, a Hall integrated circuit (Hall IC) that is simple in structure and inexpensive is generally disposed as a position sensor to detect a rotational position of the rotor. This Hall IC detects a magnetic pole position of the rotor of the permanent-magnet synchronous motor, and on a basis of information about the detected magnetic pole position, the PWM inverter applies alternating-current voltages to stator windings of the permanent-magnet synchronous motor to drive the rotor.

However, in place of a position detection circuit using the Hall IC, a sensorless method has increasingly been used recently for estimating a rotor position from rotational electromotive force information or current information about a motor. The use of the sensorless method can save costs of the Hall IC and advantageously enhances freedom in designing a motor and control circuitry because of being free of a structural restriction, which requires the Hall IC to be disposed in close proximity to the rotor. Patent Literature 1 discloses what is known as a ventilator adopting the sensorless method.

CITATION LIST

Patent Literature

Patent Literature 1: Japanese Patent No. 6225326

SUMMARY

Technical Problem

In Patent Literature 1, however, the technique adopting the sensorless method requires detection of motor current values of all three phases, thus problematically complicating current detection resistors and an accompanying circuit portion.

The present invention has been made in view of the above, and an object of the present invention is to obtain a permanent-magnet synchronous motor that is capable of detecting motor current values while having a simpler hardware configuration.

Solution to Problem

In order to solve the above-described problem and achieve the object, a permanent-magnet synchronous motor of the present invention includes an inverter power circuit including a plurality of switching elements that are switched to convert direct-current power to three-phase alternating-current power, a motor body to be driven by the three-phase alternating-current power, the motor body including a stator and a rotor, and a current detector to calculate an excitation current value and a torque current value from respective motor current values of two phases of the stator and an estimated value of a magnetic pole position of the rotor. A permanent-magnet synchronous motor of the present invention further includes a magnetic pole position detector to determine, for output to the current detector, the estimated value from the excitation current value, the torque current value, and supply voltage information, a voltage calculation unit to calculate, by means of the excitation current value, the torque current value, and an angular velocity calculated from the estimated value, the supply voltage information that causes the torque current value to approximate a torque current command value, and an inverter controller to control the inverter power circuit on a basis of the supply voltage information and the estimated value.

Advantageous Effect of Invention

A permanent-magnet synchronous motor according to the present invention is capable of motor current value detection while having a simpler hardware configuration.

DESCRIPTION OF EMBODIMENTS

With reference to the drawings, a detailed description is hereinafter provided of permanent-magnet synchronous motors and ventilation blowers according to embodiments of the present invention. It is to be noted that these embodiments are not restrictive of the present invention.

First Embodiment

Figure 1:
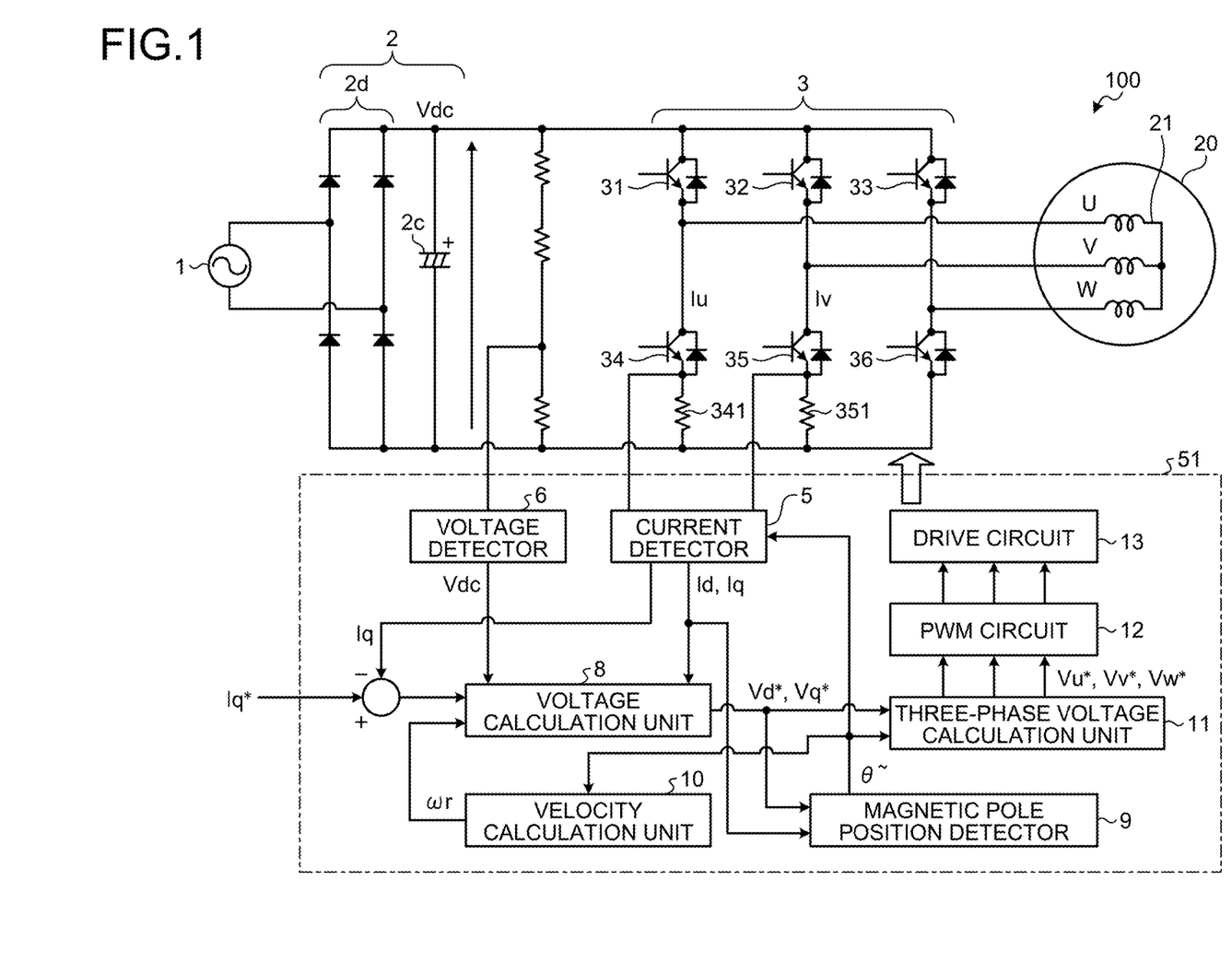
FIG. 1 is a block diagram illustrating a configuration of a permanent-magnet synchronous motor according to a first embodiment of the present invention.

FIG. 1 is a block diagram illustrating a configuration of a permanent-magnet synchronous motor 100 according to the first embodiment of the present invention. The permanent-magnet synchronous motor 100 is a PWM inverter-driven permanent-magnet synchronous motor.

The permanent-magnet synchronous motor 100 includes a rectifying and smoothing circuit 2 connected to an alternating-current power supply 1, a PWM-driven inverter power circuit 3, a permanent-magnet motor body 20, and a motor torque controller 51. The motor body 20 includes a stator 21 and a permanent-magnet rotor that is not illustrated.

The rectifying and smoothing circuit 2 is composed of a rectifier circuit 2d and a smoothing capacitor 2c and converts alternating-current power that is supplied by the alternating-current power supply 1 to direct-current power for supply to the inverter power circuit 3. The inverter power circuit 3 is composed of transistors 31 to 33 which are upper-arm switching elements, and transistors 34 to 36 which are lower-arm switching elements. The transistors 31 to 36 of the inverter power circuit 3 are switched to convert the direct-current power supplied by the rectifying and smoothing circuit 2 to variable-voltage and variable-frequency three-phase alternating-current power. The three-phase alternating-current power output from the inverter power circuit 3 is supplied to the motor body 20 to drive the motor body 20. In other words, alternating currents for three phases are supplied to the stator 21 to control rotation of the rotor. While bipolar transistors are used as the transistors 31 to 36 in FIG. 1, it is to be noted that metal-oxide-semiconductor field-effect transistors (MOSFETs) may be used instead because there is no limitation on the switching element.

The motor torque controller 51 includes a voltage detector 6 that detects a direct-current bus voltage Vdc being input to the inverter power circuit 3, a current detector 5 that detects a motor current value Iu and a motor current value Iv for conversion to an excitation current value Id and a torque current value Iq, a voltage calculation unit 8 that calculates for output a d-axis voltage command value Vd* and a q-axis voltage command value Vq*, a magnetic pole position detector 9 that determines an estimated value θ~ of a magnetic pole position of the rotor, a velocity calculation unit 10 that calculates an angular velocity ωr from the estimated value θ~ determined by the magnetic pole position detector 9, a three-phase voltage calculation unit 11 that calculates, for output, three phase voltage command values Vu*, Vv*, and Vw*, a PWM circuit 12 that generates, for output, PWM signals respectively based on the command values Vu*, Vv*, and Vw*, and a drive circuit 13 that drives the transistors 31 to 36 on a basis of the PWM signals.

The current detector 5 detects the motor current values Iu and Iv in respective windings that correspond respectively to two of the phases of the stator 21. Specifically, the motor current values Iu and Iv are detected by detecting values of voltages respectively caused by those currents that flow respectively through shunt resistors 341 and 351, which are current detection resistors connected respectively to emitter sides of the lower-arm transistors 34 and 35 of the inverter power circuit 3, and converting these voltage values to the current values. The current detector 5 converts the detected motor current values Iu and Iv to the excitation current value Id and the torque current value Iq in a manner described below. It is to be noted that the motor current values that the current detector 5 detects may be motor current values of any two of the three phases and thus may be the motor current value Iu and a motor current value Iw, or the motor current values Iv and Iw. The same holds for an argument given below.

The excitation current value Id and the torque current value Iq here are a d-axis current value and a q-axis current value, respectively, where a d axis corresponds to a magnetic axis of the rotor at the magnetic pole position θ, while a q axis corresponds to an axis shifted 90° from the d axis in a rotor reference frame. The torque current value Iq is a current value proportional to torque that is produced in the motor. The excitation current value Id and the torque current value Iq are expressed by Formula (1) below that uses the magnetic pole position θ and the motor current values Iu, Iv, and Iw.

[Formula 1]

$$\begin{pmatrix} Id \\ Iq \end{pmatrix} = \sqrt{\frac{2}{3}} \begin{pmatrix} \sin\theta & \sin(\theta - 2\pi/3) & \sin(\theta + 2\pi/3) \\ \cos\theta & \cos(\theta - 2\pi/3) & \cos(\theta + \pi/3) \end{pmatrix} \begin{pmatrix} Iu \\ Iv \\ Iw \end{pmatrix} \quad (1)$$

The motor current values Iu, Iv, and Iw have the following relation as expressed by Formula (2).

[Formula 2]

$$Iw = -(Iu + Iv) \quad (2)$$

Relations as expressed by Formulas (3) and (4) below are therefore obtained from Formulas (1) and (2).

[Formula 3]

$$\begin{pmatrix} Id \\ Iq \end{pmatrix} = \qquad (3)$$

$$\sqrt{\frac{2}{3}} \begin{pmatrix} \sin\theta - \sin(\theta + 2\pi/3) & \sin(\theta - 2\pi/3) - \sin(\theta + 2\pi/3) \\ \cos\theta - \cos(\theta + \pi/3) & \cos(\theta - 2\pi/3) - \cos(\theta + \pi/3) \end{pmatrix} \begin{pmatrix} Iu \\ Iv \end{pmatrix}$$

[Formula 4]

$$\begin{pmatrix} Id \\ Iq \end{pmatrix} = \sqrt{2} \begin{pmatrix} \sin(\theta - \pi/6) & -\cos\theta \\ \cos(\theta - \pi/6) & \sin\theta \end{pmatrix} \begin{pmatrix} Iu \\ Iv \end{pmatrix} \quad (4)$$

In other words, the use of the magnetic pole position θ enables the expression of the excitation current value Id and the torque current value Iq only with the motor current values Iu and Iv of the two phases. Therefore, by using the estimated magnetic pole position value θ~ determined by the magnetic pole position detector 9 as the magnetic pole position θ in Formula (4), the current detector 5 can convert the motor current values Iu and Iv to the excitation current value Id and the torque current value Iq.

In yet other words, since a voltage equation that uses the fixed d and q axes of the rotor reference frame is assumed for control of the permanent-magnet synchronous motor 100 according to the first embodiment, the excitation current value Id and the torque current value Iq that are required for this control can be calculated only with the motor current values Iu and Iv. Therefore, detection of all the motor current values of the three phases is not needed, meaning that the information required for the control can be obtained only from the motor current values of the two phases of choice. Since the current detector 5 calculates the excitation current value Id and the torque current value Iq from the motor current values Iu and Iv in the respective phase windings of the stator 21 without using direct current that flows into the inverter power circuit 3, the detection of the excitation current value Id and the torque current value Iq can be done accurately.

The voltage calculation unit 8 calculates the d-axis voltage command value Vd* and the q-axis voltage command value Vq* that cause the torque current value Iq that is output from the current detector 5 to approximate a torque current command value Iq* being given from outside the permanent-magnet synchronous motor 100. Specifically, the voltage calculation unit 8 calculates the d-axis voltage command value Vd* and the q-axis voltage command value Vq* from the direct-current bus voltage Vdc, the excitation current value Id, the torque current value Iq, the angular velocity ωr, and a differential value between the torque current command value Iq* and the torque current value Iq. The voltage calculation unit 8 outputs the d-axis and q-axis voltage command values Vd* and Vq* as supply voltage information.

The magnetic pole position detector 9 can use, as motor current information that is necessary for sensorless control, the excitation current value Id and the torque current value Iq that have been calculated by the current detector 5 and thus does not use a rotor magnetic pole position detection sensor. This means that the magnetic pole position detector 9 can determine the estimated value θ~ of the magnetic pole position of the rotor, using the excitation current value Id, the torque current value Iq, the d-axis and q-axis voltage command values Vd* and Vq* calculated as the supply voltage information by the voltage calculation unit 8, and a motor constant. The estimated value θ~ determined by the magnetic pole position detector 9 is output to the current detector 5 and is used as the magnetic pole position θ in Formula (4) for above-described calculation of the excitation current value Id and the torque current value Iq.

The three-phase voltage calculation unit 11 calculates for output the three phase voltage command values Vu*, Vv*, and Vw* from the d-axis and q-axis voltage command values Vd* and Vq* calculated as the supply voltage information by the voltage calculation unit 8 and the estimated value θ~ determined by the magnetic pole position detector 9. The three-phase voltage calculation unit 11 and the PWM circuit 12 compose an inverter controller to control the inverter power circuit 3, and under their control, the inverter power circuit 3 applies to the motor body 20 three phase voltages based on the command values Vu*, Vv*, and Vw*.

According to the first embodiment, the current detector 5 of the permanent-magnet synchronous motor 100 detects the motor current values of only the two phases in order for the necessary sensorless control to be achieved. Therefore, those components such as current detection resistors and accompanying amplifiers can be decreased. In other words, motor current value detection is enabled with a simple hardware configuration which contributes to cost reduction.

The permanent-magnet synchronous motor 100 according to the first embodiment obtains the torque current value Iq by coordinate transformation from the motor current values Iu and Iv and thus is capable of detecting an instantaneous motor torque value. Therefore, averaging pulsed direct bus current that flows in an inverter circuit by means of a smoothing filter is not needed for motor torque determination. In other words, since the instantaneous motor torque value can be detected, an operation error that might take place, for example, at a stage of averaging processing can be avoided. Therefore, greatly improved motor torque detection accuracy can be achieved.

Figure 2:
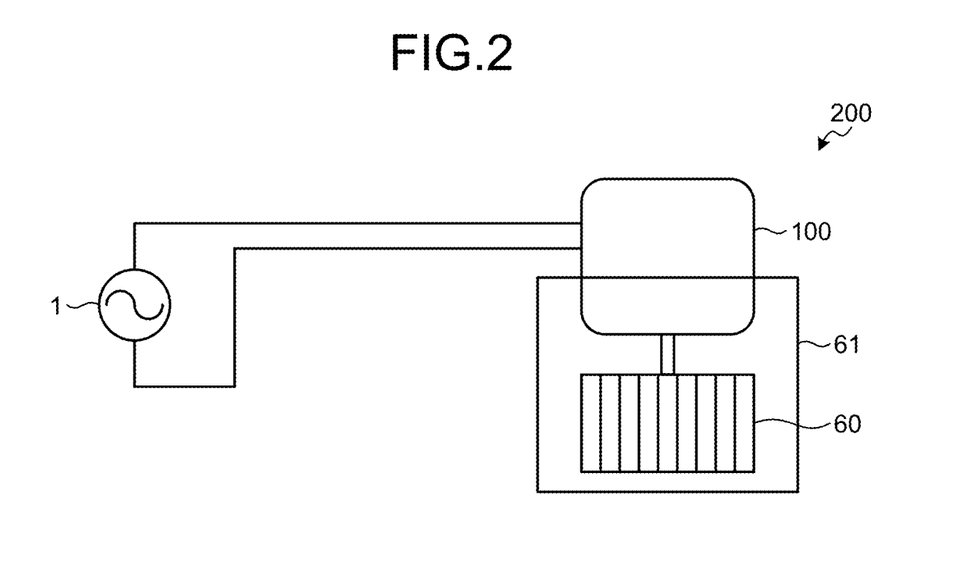
FIG. 2 illustrates a configuration of a ventilation blower according to the first embodiment.

FIG. 2 illustrates a configuration of a ventilation blower 200 according to the first embodiment. The ventilation blower 200 includes the alternating-current power supply 1, the permanent-magnet synchronous motor 100, blades 60 connected to the rotor, and a casing 61.

The permanent-magnet synchronous motor 100 is capable of motor torque control by calculating the torque current value Iq, which is a current component proportional to the torque, through direct detection of the motor currents in the motor windings. Therefore, the ventilation blower 200 can perform, without a time lag, accurate air volume control that is derived from a relation between rotating speed of the rotor and the torque.

Second Embodiment

Figure 3:
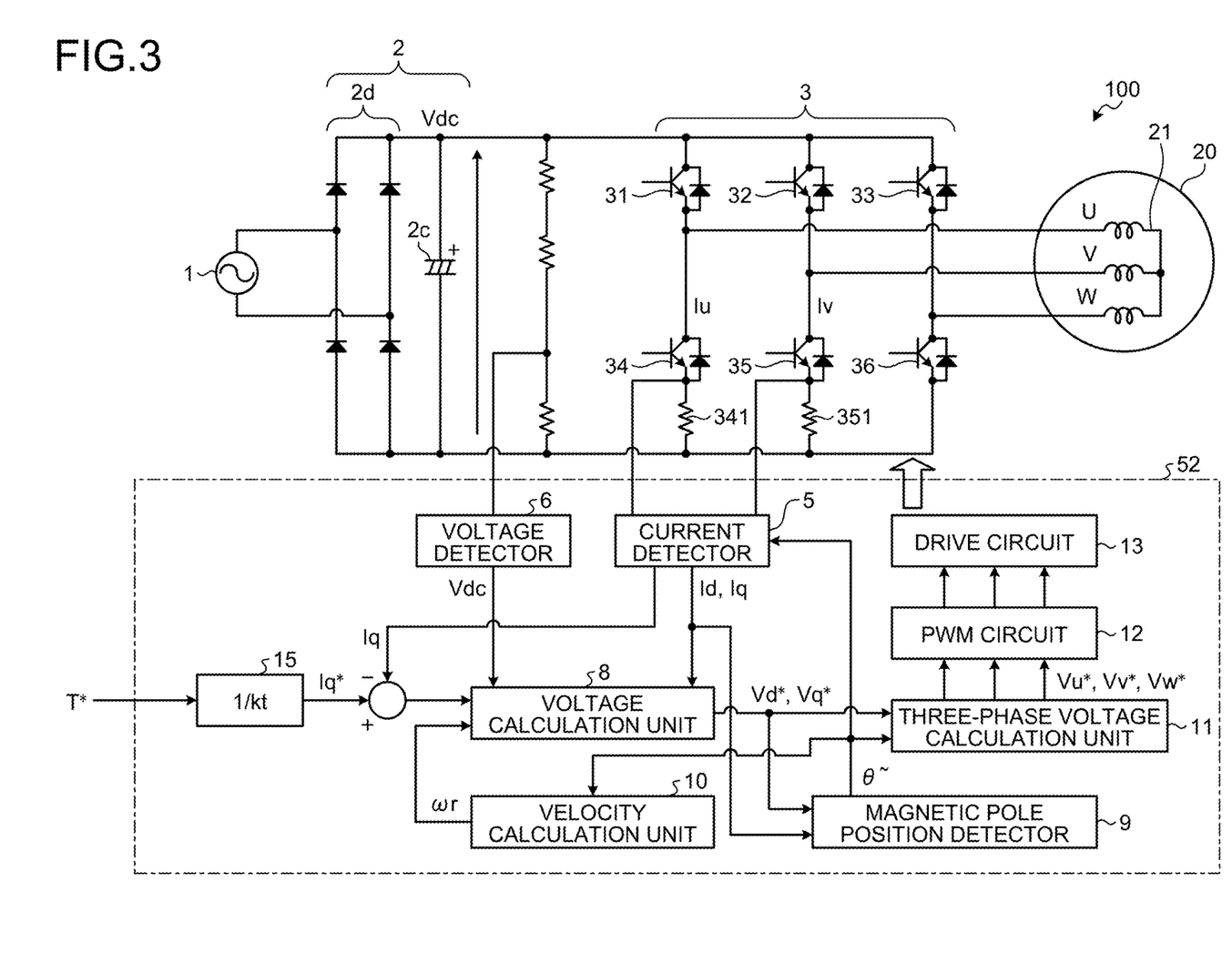
FIG. 3 is a block diagram illustrating a configuration of a permanent-magnet synchronous motor according to a second embodiment of the present invention.

FIG. 3 is a block diagram illustrating a configuration of the permanent-magnet synchronous motor 100 according to the second embodiment of the present invention. The permanent-magnet synchronous motor 100 according to the second embodiment includes a motor torque controller 52 replacing the FIG. 1 motor torque controller 51. The motor torque controller 52 is the motor torque controller 51 plus a torque current command generation unit 15.

A torque command T* for the motor is input to the motor torque controller 52. The torque current command generation unit 15 divides the torque command T* by a torque coefficient kt and outputs a resulting value as the torque current command value Iq*.

The torque current command value Iq* output by the torque current command generation unit 15 is used for control of the permanent-magnet synchronous motor 100 as in the first embodiment. Thus the permanent-magnet synchronous motor 100 according to the second embodiment can be controlled by the torque command T*.

Third Embodiment

Figure 4:
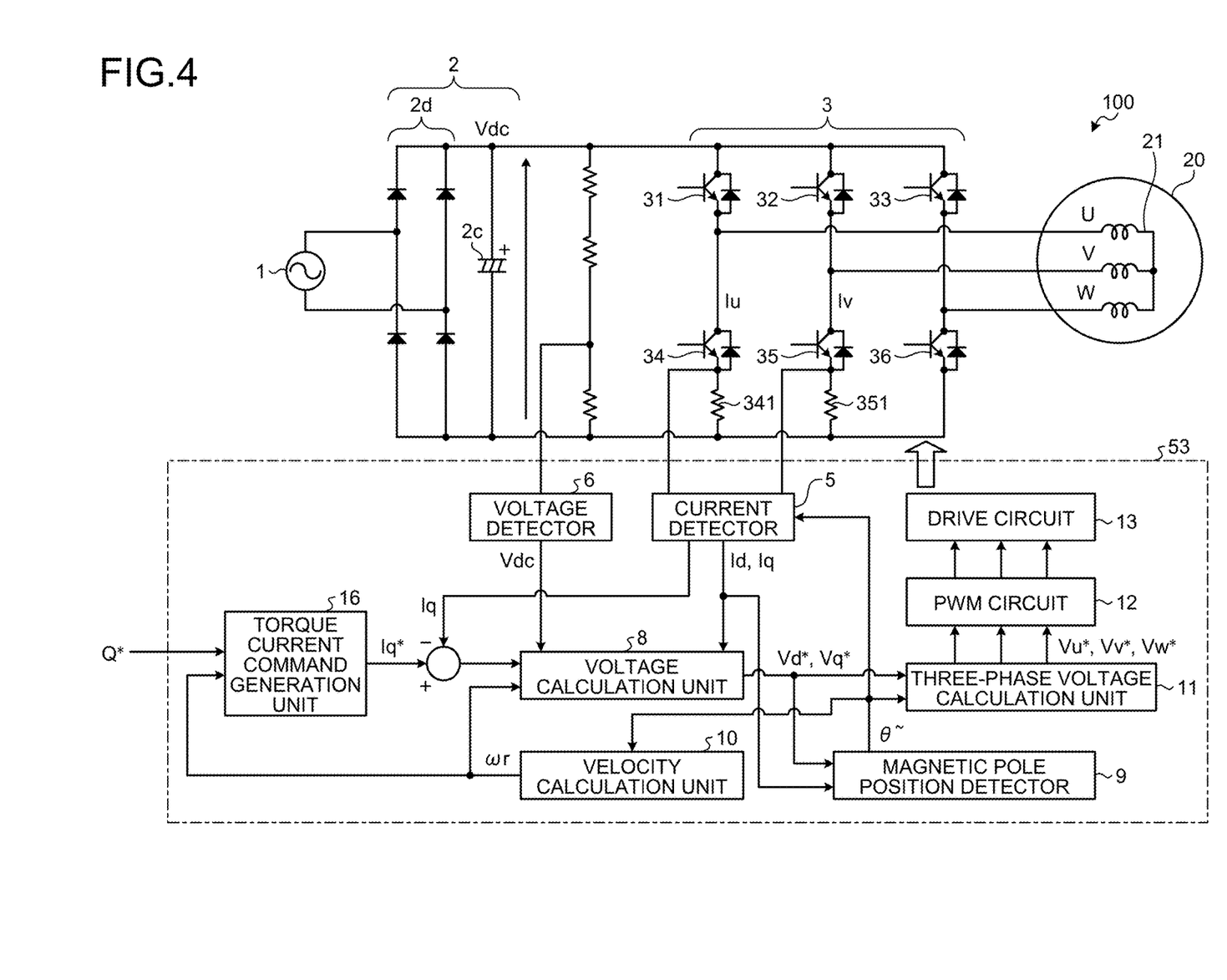
FIG. 4 is a block diagram illustrating a configuration of a permanent-magnet synchronous motor according to a third embodiment of the present invention.

FIG. 4 is a block diagram illustrating a configuration of the permanent-magnet synchronous motor 100 according to the third embodiment of the present invention. The permanent-magnet synchronous motor 100 according to the third embodiment includes a motor torque controller 53 replacing the FIG. 1 motor torque controller 51. The motor torque controller 53 is the motor torque controller 51 plus a torque current command generation unit 16.

When the ventilation blower 200 of FIG. 2 is made using the permanent-magnet synchronous motor 100 according to the third embodiment, an operational air volume command Q* is input as a target air volume to the motor torque controller 53. The torque current command generation unit 16 retains in advance a relation between the torque current command value Iq* and rotating speed of the motor for any given operational air volume. The rotating speed of the motor is proportional to the angular velocity ωr. Therefore, the torque current command generation unit 16 can calculate the torque current command value Iq* from the operational air volume command Q* and the angular velocity ωr calculated by the velocity calculation unit 10.

The torque current command value Iq* output by the torque current command generation unit 16 is used for control of the permanent-magnet synchronous motor 100 as in the first embodiment. Thus the permanent-magnet synchronous motor 100 according to the third embodiment can be controlled by the operational air volume command Q*. Control using the characteristic between the torque and the rotating speed achieves a constant air volume, so that the air volume is achieved with improved accuracy.

While the permanent-magnet synchronous motors 100 according to the first through third embodiments each include the rectifying and smoothing circuit 2, it is to be noted that the rectifier circuit 2d or the entire rectifying and smoothing circuit 2 may be omitted. This means that the permanent-magnet synchronous motor 100 may be supplied with direct-current power directly by a direct-current power supply. It goes without saying that the ventilation blower 200 of FIG. 2 may be made using the permanent-magnet synchronous motor 100 according to the second embodiment.

Figure 5:
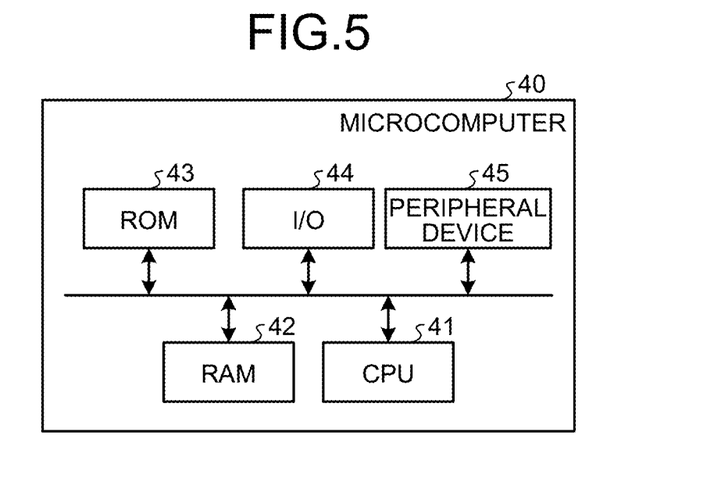
FIG. 5 is a block diagram illustrating a configuration of a microcomputer according to the first through third embodiments.

FIG. 5 is a block diagram illustrating a configuration of a microcomputer 40 according to the first through third embodiments. The microcomputer 40 includes a central processing unit (CPU) 41 that performs calculations and control, a random-access memory (RAM) 42 that the CPU 41 uses as a work area, a read-only memory (ROM) 43 that stores programs and data, input-output (I/O) 44 which is hardware for signal communication with an outside world, and a peripheral device 45 including a clock generating oscillator. Each of the motor torque controllers 51 to 53 according to the first through third embodiments is functionally implemented by the microcomputer 40 except the motor current detecting function of the current detector 5 and the function of the voltage detector 6. Implementation of the control by the microcomputer 40 translates as execution of the program which is software stored in the ROM 43 by the CPU 41. The ROM 43 may be a non-volatile memory such as a rewritable flash memory.

The above configurations illustrated in the embodiments are illustrative of contents of the present invention, can be combined with other techniques that are publicly known and can be partly omitted or changed without departing from the gist of the present invention.

REFERENCE SIGNS LIST 1 alternating-current power supply; 2 rectifying and smoothing circuit; 2c smoothing capacitor; 2d rectifier circuit; 3 inverter power circuit; 5 current detector; 6 voltage detector; 8 voltage calculation unit; 9 magnetic pole position detector; 10 velocity calculation unit; 11 three-phase voltage calculation unit; 12 PWM circuit; 13 drive circuit; 15, torque current command generation unit; 20 motor body; stator; 31 to 36 transistor; 40 microcomputer; 41 CPU; 42 RAM; 43 ROM; 44 I/O; 45 peripheral device; 51 to 53 motor torque controller; 60 blade; 61 casing; 100 permanent-magnet synchronous motor; 200 ventilation blower; 341, 351 shunt resistor.

The invention claimed is:

1. A permanent-magnet synchronous motor comprising:
an inverter power circuit including a plurality of switching elements that are switched to convert direct-current power to three-phase alternating-current power;
a motor body to be driven by the three-phase alternating-current power, the motor body including a stator and a rotor;
a current detection circuit to calculate an excitation current value and a torque current value from respective motor current values of two phases of the stator and an estimated value of a magnetic pole position of the rotor;
a magnetic pole position detection circuit to determine, for output to the current detection circuit, the estimated value from the excitation current value, the torque current value, and supply voltage information;
a voltage calculation circuit to calculate, by means of the excitation current value, the torque current value, and an angular velocity calculated from the estimated value, the supply voltage information that causes the torque current value to approximate a torque current command value; and
an inverter control circuit to control the inverter power circuit on a basis of the supply voltage information and the estimated value,
the permanent-magnet synchronous motor further comprising
a torque current command generation circuit to calculate, as the torque current command value, a value that is a torque command divided by a torque coefficient.

2. The permanent-magnet synchronous motor according to claim 1, further comprising
a rectifying and smoothing circuit to convert alternating-current power supplied by an alternating-current power supply to the direct-current power.

3. A ventilation blower comprising
the permanent-magnet synchronous motor according to claim 2.

4. A ventilation blower comprising
the permanent-magnet synchronous motor according to claim 1.

5. A permanent-magnet synchronous motor comprising:
an inverter power circuit including a plurality of switching elements that are switched to convert direct-current power to three-phase alternating-current power;
a motor body to be driven by the three-phase alternating-current power, the motor body including a stator and a rotor;
a current detection circuit to calculate an excitation current value and a torque current value from respective motor current values of two phases of the stator and an estimated value of a magnetic pole position of the rotor;
a magnetic pole position detection circuit to determine, for output to the current detection circuit, the estimated value from the excitation current value, the torque current value, and supply voltage information;
a voltage calculation circuit to calculate, by means of the excitation current value, the torque current value, and an angular velocity calculated from the estimated value, the supply voltage information that causes the torque current value to approximate a torque current command value; and
an inverter control circuit to control the inverter power circuit on a basis of the supply voltage information and the estimated value,
the permanent-magnet synchronous motor further comprising
a torque current command generation circuit to calculate the torque current command value from an operational air volume command and the angular velocity.

6. The permanent-magnet synchronous motor according to claim 5, further comprising
a rectifying and smoothing circuit to convert alternating-current power supplied by an alternating-current power supply to the direct-current power.

7. A ventilation blower comprising
the permanent-magnet synchronous motor according to claim 6.

8. A ventilation blower comprising
the permanent-magnet synchronous motor according to claim 5.

* * * * *